US012019204B2

(12) United States Patent
Xu et al.

(10) Patent No.: US 12,019,204 B2
(45) Date of Patent: Jun. 25, 2024

(54) STRATIGRAPHIC TRAP RECOGNITION USING ORBITAL CYCLICITY

(71) Applicant: SAUDI ARABIAN OIL COMPANY, Dhahran (SA)

(72) Inventors: Yin Xu, Dhahran (SA); Sihai Zhang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 92 days.

(21) Appl. No.: 17/651,719

(22) Filed: Feb. 18, 2022

(65) Prior Publication Data

US 2023/0266494 A1    Aug. 24, 2023

(51) Int. Cl.
*G01V 5/12* (2006.01)
*G01V 5/04* (2006.01)

(52) U.S. Cl.
CPC ............... *G01V 5/12* (2013.01); *G01V 5/045* (2013.01)

(58) Field of Classification Search
CPC ................................ G01V 5/12; G01V 5/045
See application file for complete search history.

(56) References Cited

U.S. PATENT DOCUMENTS 5,159,833 A * 11/1992 Graebner ............ G01V 7/00
73/152.52
10,365,261 B2  7/2019 Montgomery et al.
2004/0158405 A1  8/2004 Nio
2007/0260403 A1  11/2007 Wood
2011/0218737 A1  9/2011 Gulati
(Continued)

FOREIGN PATENT DOCUMENTS

CN    104089964 B    8/2016
CN    107884830 A    4/2018
(Continued)

OTHER PUBLICATIONS

Britannica, "Sedimentary structures", www.britannica.com/science/sedimentary-rock/Sedimentary-structures, Oct. 23, 2021 (Year: 2021).*
(Continued)

*Primary Examiner* — Catherine T. Rastovski
*Assistant Examiner* — Yossef Korang-Beheshti
(74) *Attorney, Agent, or Firm* — Osha Bergman Watanabe & Burton LLP

(57) ABSTRACT

A method of determining a presence of stratigraphic traps includes obtaining a Gamma ray (GR) log dataset. The GR log dataset includes values for a plurality of wells in an area of interest. The method includes determining a geological time period corresponding to a depth in the GR log dataset; determining a spectrum of Earth's orbital parameters corresponding to the geological time period; determining peak frequencies of the spectrum of Earth's orbital parameters; and determining a quantity of orbital cycles per well in the area of interest. The spectrum of Earth's orbital parameters includes parameters for eccentricity, obliquity, and precession. The orbital cycles may be reflected as sedimentary patterns in a geologic record. The method includes determining a presence of stratigraphic traps, based, at least in part, on differences in quantities of orbital cycles between one or more wells in the area of interest.

8 Claims, 9 Drawing Sheets

(56) References Cited

U.S. PATENT DOCUMENTS

| | | | |
|---|---|---|---|
| 2011/0264430 A1* | 10/2011 | Tapscott | G01V 99/00 703/10 |
| 2011/0282634 A1 | 11/2011 | Marza et al. | |
| 2013/0300570 A1* | 11/2013 | Cooper | G01V 5/12 340/854.4 |
| 2015/0285943 A1* | 10/2015 | Stoller | G01N 33/24 702/8 |
| 2017/0212260 A1* | 7/2017 | Padhi | G01V 1/282 |

FOREIGN PATENT DOCUMENTS

| | | | | |
|---|---|---|---|---|
| CN | 108427146 A | * | 8/2018 | G01V 5/12 |
| CN | 108427146 A | | 8/2018 | |
| CN | 108919369 B | | 10/2019 | |
| CN | 112817059 A | * | 5/2021 | |
| WO | WO-2022073027 A1 | * | 4/2022 | E21B 44/00 |

OTHER PUBLICATIONS

Werner Ricken, "Bedding Rhythms and cyclic sequences as documented in organic carbon-carbonate patterns, Upper Cretaceous, Western Interior, US", Sedimentary Geology, vol. 102, Issues 1-2, Mar. 1996, pp. 131-154 (Year: 1996).*

Hinnov, L.A. et al., "Cyclostratigraphy and the Astronomical Time Scale", Stratigraphy, vol. 4, Nos. 2-3, pp. 239-251, 2007 (15 pages).

Schwarzacher, W., "Chapter 3—Cyclostratigraphy and the Milankovitch Theory", Developments in Sedimentology 52, Elsevier, 1993 (21 pages).

Laskar, J. et al., "A long-term numerical solution for the insolation quantities of the Earth", Astronomy & Astrophysics, 428(1), pp. 261-285, 2004 (26 pages).

Fischer, A.G. et al., "Orbital Forcing and Sedimentary Sequences", Journal of Sedimentary Petrology, vol. 61, No. 7, 1991 (7 pages).

* cited by examiner

STRATIGRAPHIC TRAP RECOGNITION USING ORBITAL CYCLICITY

BACKGROUND

Gamma ray (GR) logging is a tool used to determine characteristics of subsurface geological formations during the well logging process. GR logs measure naturally occurring gamma radiation to characterize rock or sediment regions within a wellbore. Stratigraphic traps, or geological features conducive to retaining hydrocarbons, may be identified using GR logs for wells in an area of interest. The long-term effects of Earth's planetary movements are reflected in the geological record, and may be expressed as fluctuating orbital parameter values over the course of geologic time. Orbital parameters may be used in conjunction with GR logs to determine a presence of stratigraphic traps, and in turn, a potential presence of hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments of the invention relate to a method of determining a presence of stratigraphic traps, comprising: obtaining a Gamma ray (GR) log dataset, wherein the GR log dataset comprises values for a plurality of wells in an area of interest; determining a geological time period corresponding to a depth in the GR log dataset; determining, using a computer processor, a spectrum of Earth's orbital parameters corresponding to the geological time period, wherein the spectrum of Earth's orbital parameters comprises parameters for eccentricity, obliquity, and precession; determining, using the computer processor, peak frequencies of the spectrum of Earth's orbital parameters; determining a quantity of orbital cycles per well in the area of interest, wherein the orbital cycles may be reflected as sedimentary patterns in a geologic record; and determining, using the computer processor, a presence of stratigraphic traps, based, at least in part, on differences in quantities of orbital cycles between one or more wells in the area of interest.

In general, in one aspect, embodiments of the invention relate to a non-transitory computer readable medium storing instructions executable by a computer processor, the instructions comprising functionality for: receiving a Gamma ray (GR) log dataset, wherein the GR log dataset comprises values for a plurality of wells in an area of interest; determining a geological time period corresponding to a depth in the GR log dataset; determining, using a computer processor, a spectrum of Earth's orbital parameters corresponding to the geological time period, wherein the spectrum of Earth's orbital parameters comprises parameters for eccentricity, obliquity, and precession; determining, using the computer processor, peak frequencies of the spectrum of Earth's orbital parameters; determining a quantity of orbital cycles per well in the area of interest, wherein the orbital cycles may be reflected as sedimentary patterns in a geologic record; and determining, using the computer processor, a presence of stratigraphic traps, based, at least in part, on differences in quantities of orbital cycles between one or more wells in the area of interest.

In general, in one aspect, embodiments of the invention relate to a system comprising: a logging system coupled to a plurality of logging tools; a drilling system coupled to the logging system; and a computer processor, configured to: obtain a Gamma ray (GR) log dataset, wherein the GR log dataset comprises values for a plurality of wells in an area of interest; determine a geological time period corresponding to a depth in the GR log dataset; determine, using a computer processor, a spectrum of Earth's orbital parameters corresponding to the geological time period, wherein the spectrum of Earth's orbital parameters comprises parameters for eccentricity, obliquity, and precession; determine, using the computer processor, peak frequencies of the spectrum of Earth's orbital parameters; determine a quantity of orbital cycles per well in the area of interest, wherein the orbital cycles may be reflected as sedimentary patterns in a geologic record; and determine, using the computer processor, a presence of stratigraphic traps, based, at least in part, on differences in quantities of orbital cycles between one or more wells in the area of interest.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
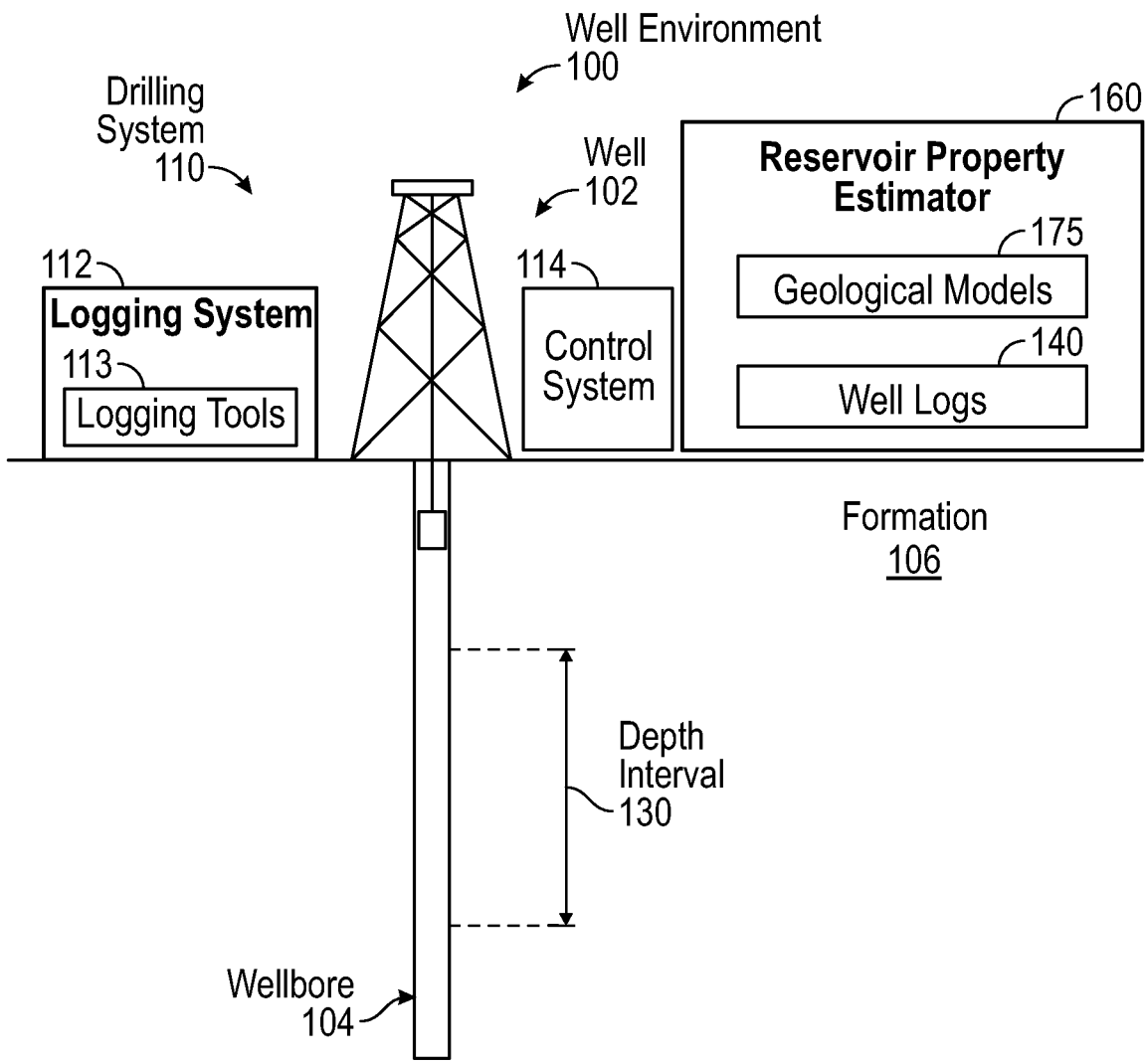
FIG. 1 depicts a well environment in accordance with one or more embodiments.

FIG. 1 depicts a well environment (100) in accordance with one or more embodiments. The well environment (100) may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, density, water saturation, total organic content, volume of kerogen, Young's modulus, Poisson's ratio and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. Water saturation may indicate the fraction of water in a given pore space.

In keeping with FIG. 1, the well environment (100) may include a drilling system (110), a logging system (112), a control system (114), and a reservoir property estimator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir property estimator (160), a reservoir property estimator (160) may include hardware and/or software with functionality for storing and analyzing well logs (140) and/or other types of data to generate and/or update one or more geological models (175). Geological models may include geochemical or geomechanical models that describe structural relationships within a particular geological region. While the reservoir property estimator (160) is shown at a well site, in some embodiments, the reservoir property estimator (160) may be remote from a well site. In some embodiments, the reservoir property estimator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir property estimator (160) may include a computer system that is similar to the computer system (902) described below with regard to FIG. 9 and the accompanying description.

The logging system (112) may include one or more logging tools (113) for use in generating well logs (140) of the formation (106). For example, a logging tool may be lowered into the wellbore (104) to acquire measurements as the tool traverses a depth interval (130) (e.g., a targeted reservoir section) of the wellbore (104). The plot of the logging measurements versus depth may be referred to as a "log" or "well log." Well logs (104) may provide depth measurements of the well (102) that describe such reservoir characteristics as formation porosity, formation permeability, resistivity, density, water saturation, total organic content, volume of kerogen, Young's modulus, Poisson's ratio, and the like. The resulting logging measurements may be stored and/or processed, for example, by the control system (114), to generate corresponding well logs (140) for the well (102). A well log may include, for example, a plot of a logging response time versus true vertical depth (TVD) across the depth interval (130) of the wellbore (104).

Figure 2:
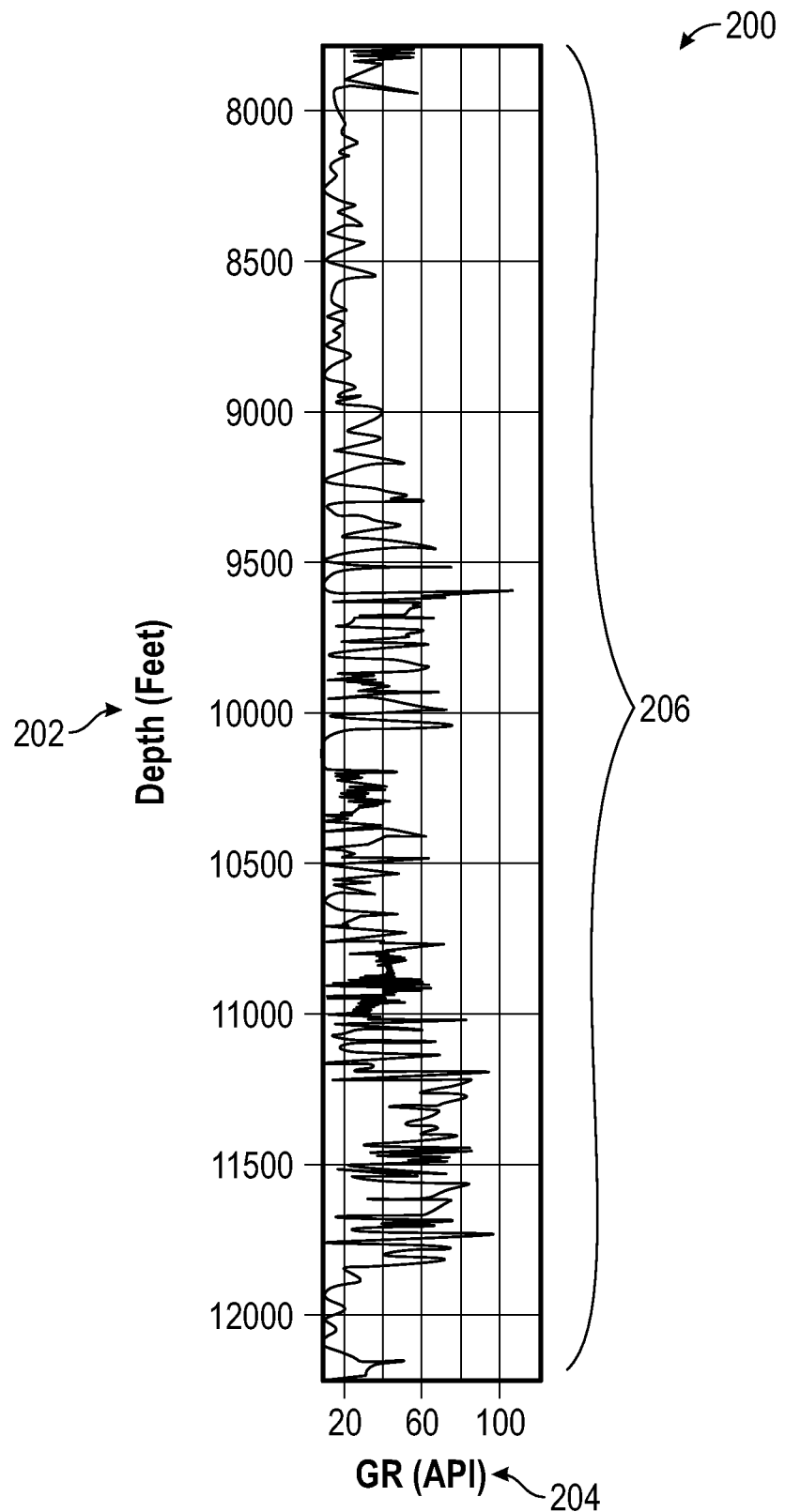
FIG. 2 shows elements of a GR log associated with a well in accordance with one or more embodiments.

FIG. 2 depicts elements of a GR log (200) associated with a well in accordance with one or more embodiments. Wireline logs, including GR logs (200), provide measured rock properties at various depth points of a drilled well. The wireline logs, including GR logs (200), may be saved in a binary file of the LASer format (hereinafter also "a LAS file"). A LAS file stores the wireline logs for a particular well.

In accordance with one or more embodiments, GR logging is used to measure naturally occurring gamma radiation to characterize rock or sediment regions within a wellbore (104). In particular, different types of rock may emit different amounts and different spectra of natural gamma radiation. For example, GR logs (200) may distinguish between shales and sandstones/carbonate rocks because radioactive potassium may be common to shales.

As shown in FIG. 2, the vertical axis (202) indicates the depth at which the various wireline log measurements have been obtained from a well (102). The horizontal axis (204) indicates the measurement scale of the GR log (200) in API units, which is the reference standard that allows comparisons to be made between a wide variety of gamma-ray counting devices. Further, FIG. 2 illustrates the GR data for the well (102), measured at a plurality of depths (206) of the well (102). In some instances, the depth spacing interval is half a foot.

Figure 3:
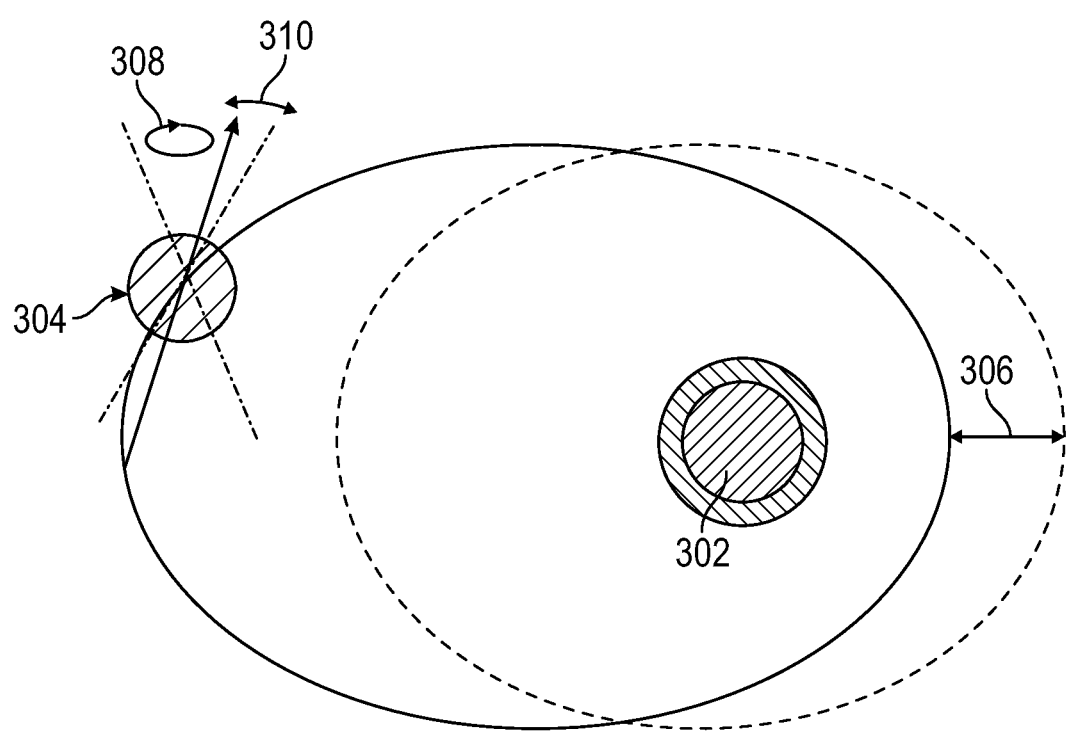
FIG. 3 depicts orbital parameters in accordance with one or more embodiments.

FIG. 3 depicts orbital parameters in accordance with one or more embodiments. The Earth (304) and its position in orbit relative to the Sun (302) are shown. Orbital parameters may include eccentricity (306), obliquity (310), and precession (308). Eccentricity (306) is the orbit of Earth (304) around the Sun (302) as the orbit approximates the shape of an ellipse. Eccentricity (306) measures the departure of this ellipse from circularity. When Earth's orbit is most elliptic, more incoming solar radiation reaches Earth (304) at the planet's closest approach to the Sun (302) each year, than does at its farthest departure from the Sun (302). Obliquity (310), or tilt, is the angle between the equatorial and orbital planes of the Earth (304). Obliquity (310) controls the amount of solar radiation that is received by higher latitudes. The greater Earth's axial tilt angle, or angle of obliquity, the more extreme seasons may be, as each hemisphere receives more solar radiation during its summer, when the hemisphere is tilted toward the Sun (302), and less during winter, when it is tilted away from the Sun (302). Precession (308) is a gravity-induced, slow, and continuous change in the orientation of the rotational axis of the Earth (304). The effects of precession make seasonal contrasts more extreme in one hemisphere and less extreme in the other.

In accordance with one or more embodiments, these changing orbital parameters, or cyclical changes in the planet's movement, result in varying amounts of solar radiation reaching the Earth (304), and ultimately affect the planet's long-term climate. These cyclical changes may be observed as sedimentary patterns in Earth's geologic record. These sedimentary patterns in the geologic record may be expressed as rhythmic, repetitive patterns of sedimentation.

Figure 4:
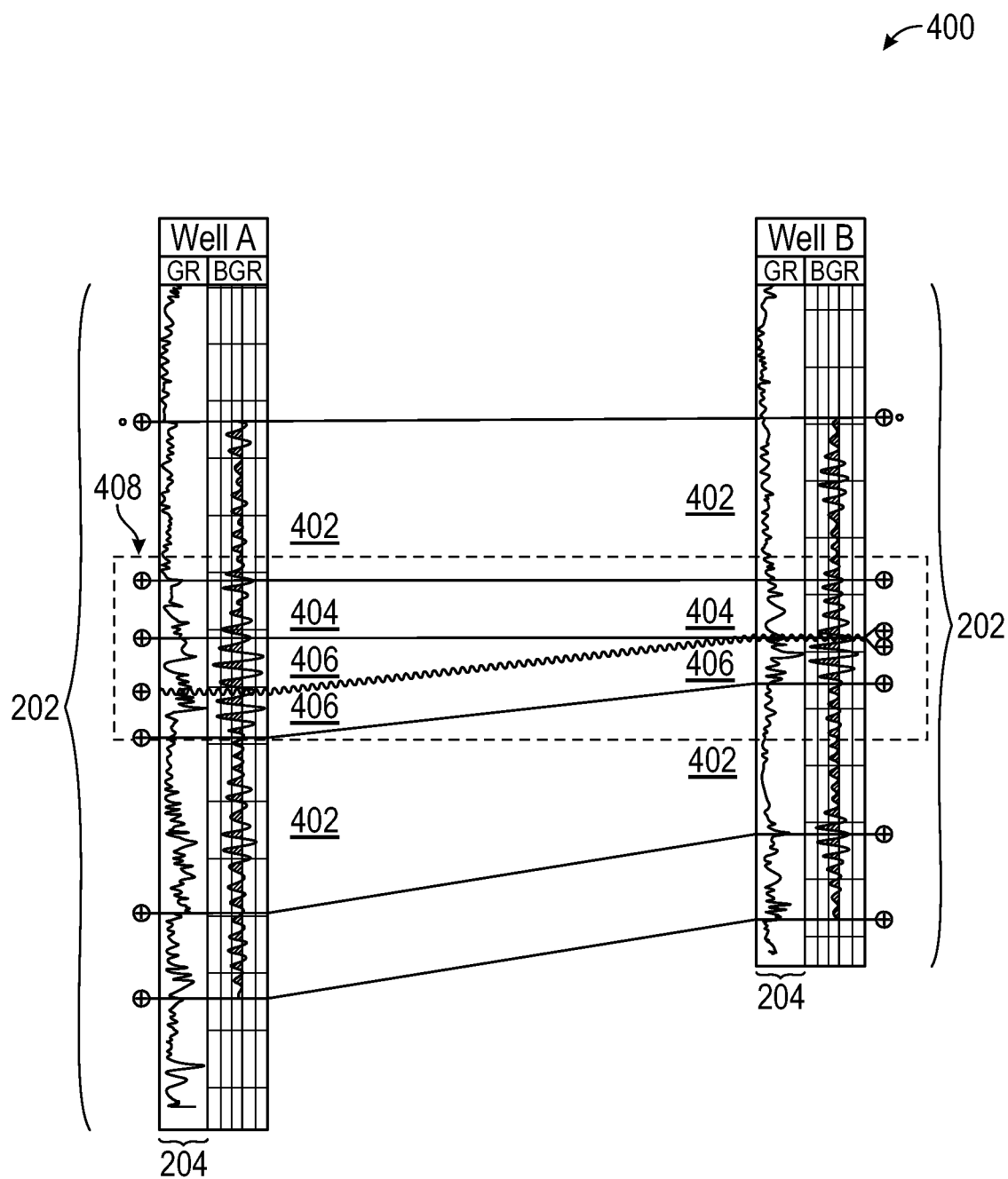
FIG. 4 shows well correlation in accordance with one or more embodiments.

FIG. 4 shows well correlation in accordance with one or more embodiments. Performing well correlation involves identifying points between wells in which the data suggest that the points were deposited at the same time or have similar characteristics. Well correlation, including attempting to compare and/or match up well log signatures (400) across regions of interest may help to determine the equivalence, extent, thickness, quality, relative age, or other properties of stratigraphic units.

In accordance with one or more embodiments, FIG. 4 shows an example GR log (200) for Well A and an example GR log (200) for Well B. Well A and Well B are wells within the same area of interest. The vertical axis (202) shown in FIG. 4 indicates the depth at which various wireline log measurements have been obtained from wells. Separate stratigraphic units (402, 404, 406) are identified as being present in both Well A and Well B. The horizontal axis (204) indicates the measurement scale of the GR log (200) in API units, which is the reference standard that allows comparisons to be made between a wide variety of gamma-ray counting devices. The stratigraphic units (402, 404, 406) may be correlated between Well A and Well B using pattern recognition of the GR log (200) or number of cycles on a BGR log. The stratigraphic units (402, 404, 406) may be correlated using any method familiar to a person of ordinary skill in the art without departing from the scope of the invention. The correlation of stratigraphic units between Well A and Well B depicts an area containing a potential stratigraphic trap (408) observed as a pinch-out between stratigraphic units (404, 406), which is described in greater detail in FIG. 5.

Figure 5:
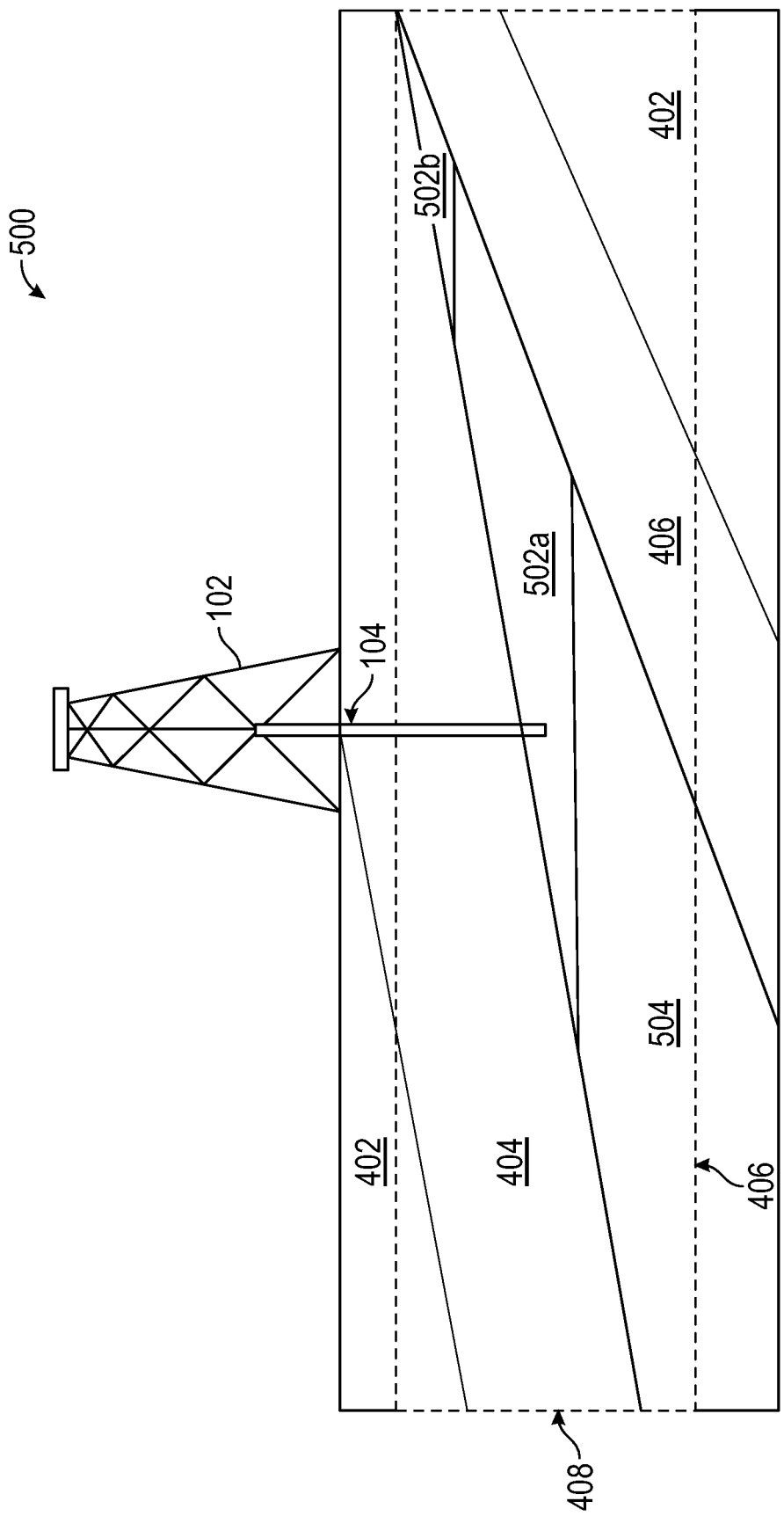
FIG. 5 depicts an area containing a potential stratigraphic trap in accordance with one or more embodiments.

FIG. 5 depicts an additional well environment (500) containing a potential stratigraphic trap (408) in accordance with one or more embodiments. A stratigraphic trap is a sealed geologic region whose geometry permits retention of hydrocarbons, and is formed by changes in rock type, or pinch-outs, unconformities, or other sedimentary features. The termination by tapering out, or "pinching out" of a reservoir against a sealing rock creates geometry which permits the retention of hydrocarbons. As shown in FIG. 5, a well (102) having a wellbore (104) extends from the surface into a target zone of a formation. Stratigraphic units (402, 404, 406) form cap rocks, which may seal an accumulation of hydrocarbons. Hydrocarbons in the form of oil (502a) and gas (502b) deposits are contained in the portion of a stratigraphic unit as it pinches out (406). Water (504) is shown underlying the hydrocarbon deposits (502a, 502b).

Figure 6:
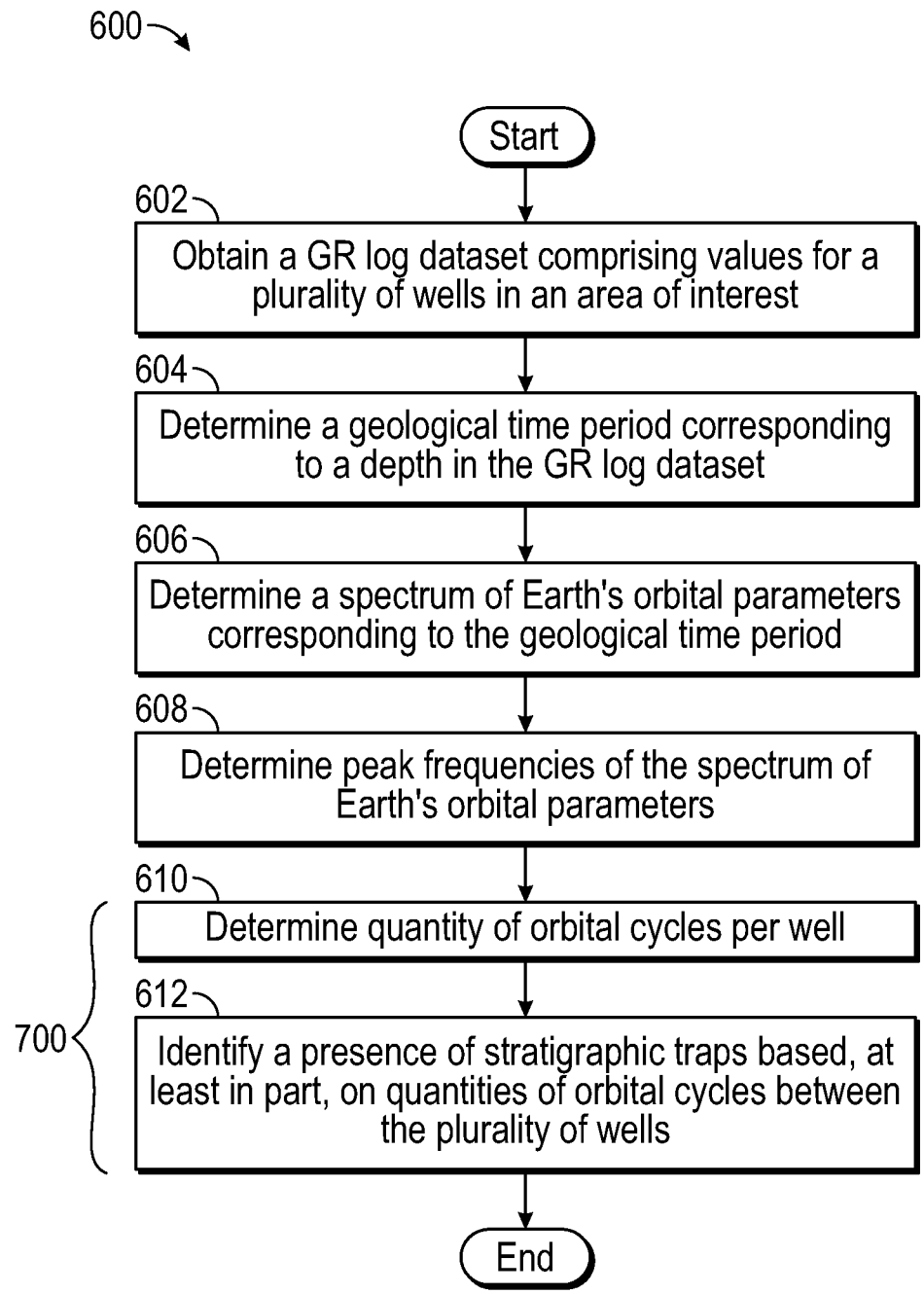
FIG. 6 shows a flowchart in accordance with one or more embodiments.

FIG. 6 shows a flowchart (600) in accordance with one or more embodiments. In Step 602, a GR log dataset is obtained, which comprises values for a plurality of wells in an area of interest. In Step 604, for each of the plurality of wells in the area of interest, a geological time period is selected. The geological time period corresponds to a depth in the GR log (200). In Step 606, a spectrum of Earth's orbital parameters is determined. The spectrum of Earth's orbital parameters corresponds to the geological time period and depth of the GR log (200). Orbital parameters may include parameters for eccentricity (306), obliquity (310), and precession (308). In Step 608, peak frequencies are determined for the spectrum of Earth's orbital parameters for each of the plurality of wells in the area of interest using a method of spectral analysis familiar to a person of ordinary skill in the art without departing from the scope of the invention.

In Step 610, in accordance with one or more embodiments, the number of orbital cycles is determined for each of the plurality of wells in the area of interest. Orbital cycles may be expressed as sedimentary patterns in the geologic record. In Step 612, a presence of stratigraphic traps is identified based, at least in part, on quantities of orbital cycles between the plurality of wells in the area of interest, and can be further integrated with additional information such as top seal and bottom seal information. Step 610-Step 612 are described in greater detail in a flowchart (700) of FIG. 7.

Figure 7:
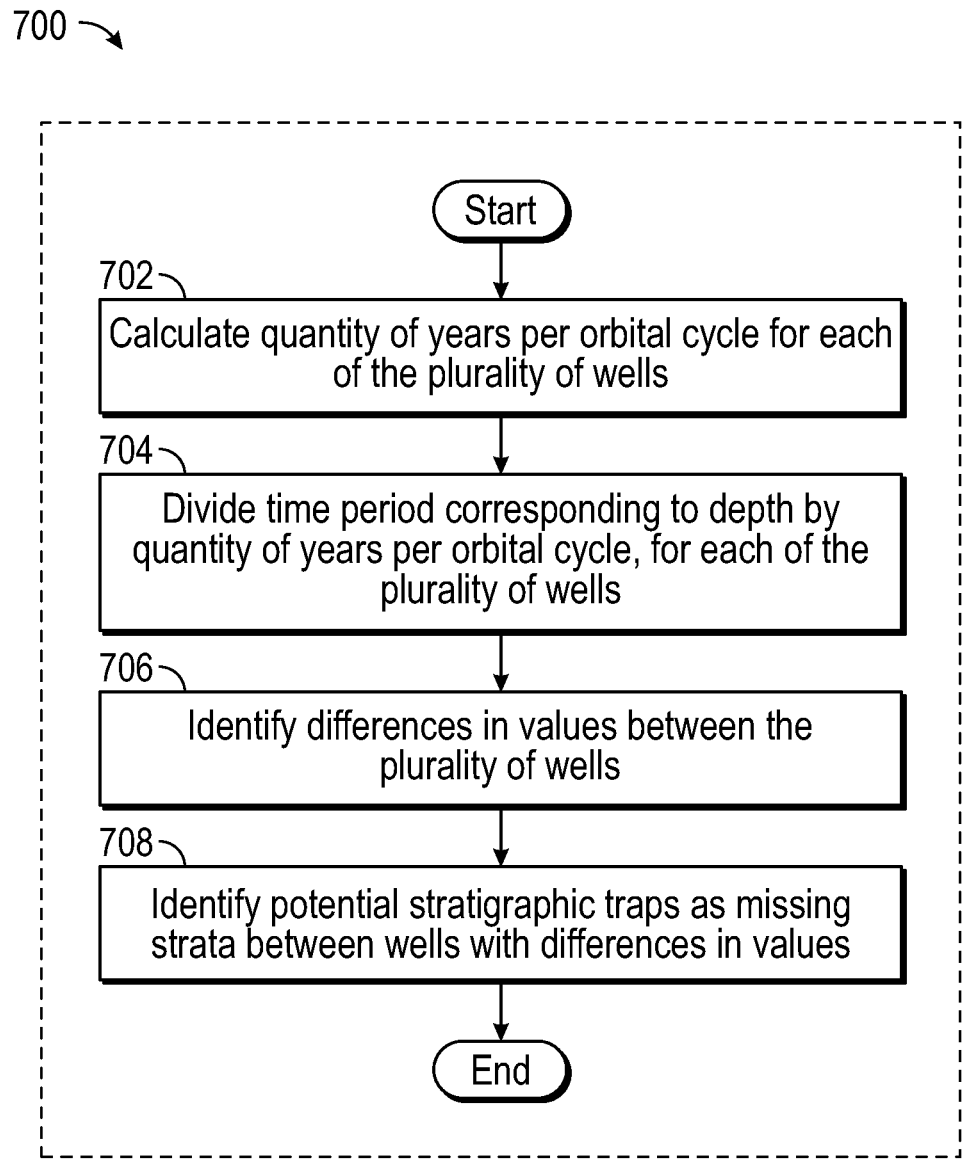
FIG. 7 shows a flowchart in accordance with one or more embodiments.

FIG. 7 shows the flowchart (700) in accordance with one or more embodiments. Step 610-Step 612 of FIG. 6 are described in greater detail. In Step 702, for each of the plurality of wells in the area of interest, a quantity of years per orbital cycle is calculated. In Step 704, the geological time period corresponding to depth, obtained in Step 604 of FIG. 6, is divided by the quantity of years per orbital cycle, as obtained in Step 702. In Step 706, the quantity of orbital cycles is compared among the plurality of wells in an area of interest, and any differences in values of quantities of orbital cycles between each of the plurality of wells, are identified. Differences in quantities of orbital cycles between wells may be an indicator of missing strata, which could be observed during well correlation. Per Step 708, missing strata between wells may be indicative of a pinch-out, or conditions favorable for formation of stratigraphic traps. A presence of stratigraphic traps may be indicative of a potential presence of hydrocarbons.

Figure 8:
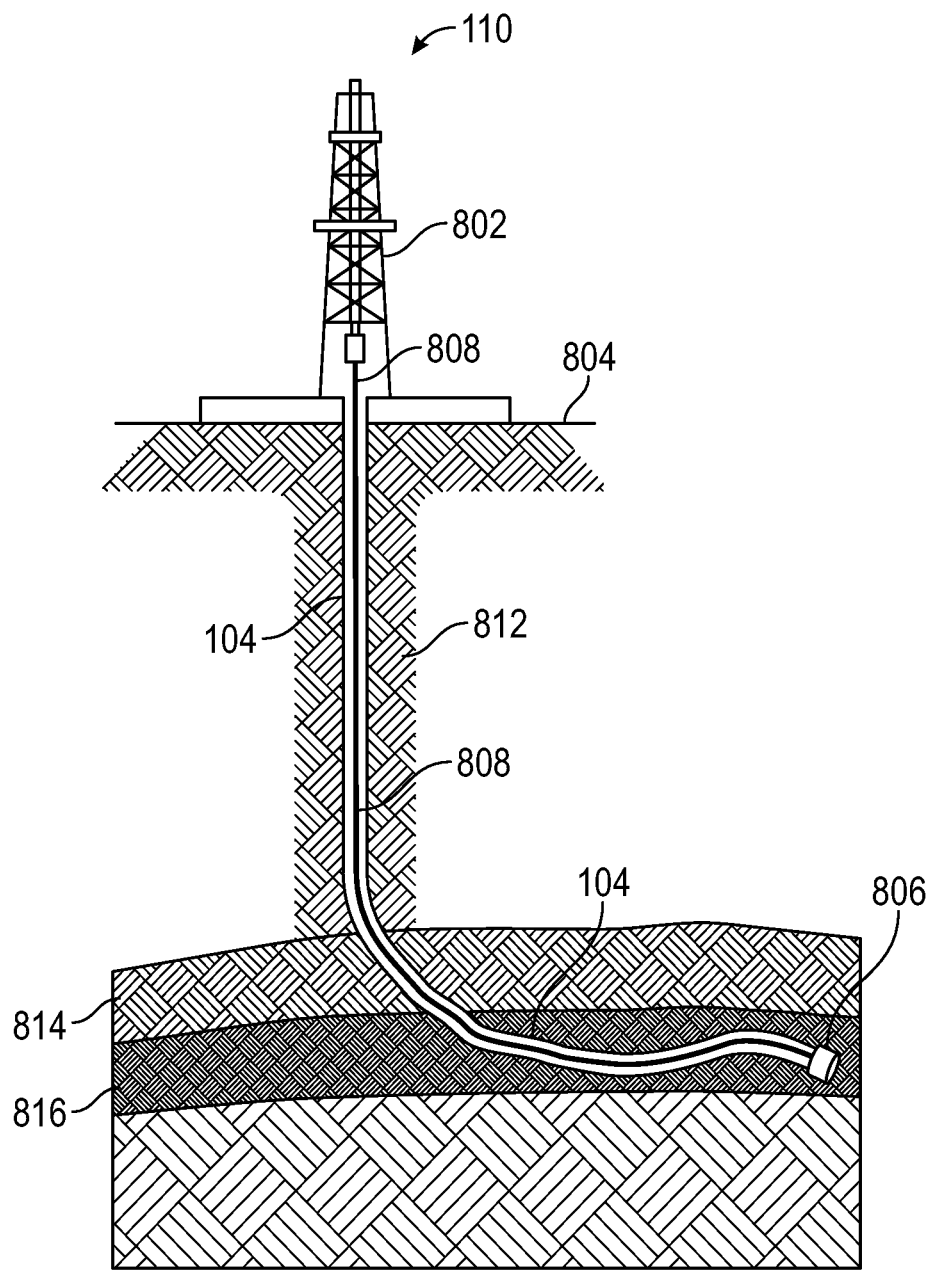
FIG. 8 depicts a drilling system in accordance with one or more embodiments.

FIG. 8 depicts a drilling system (110) in accordance with one or more embodiments. The drilling system (110) may include a derrick (802). In some embodiments, the derrick (802) may be located on the land surface (804). In other embodiments, the derrick may be located on a jack-up drill rig (not shown), or a floating drill rig (not shown), on a drill ship (not shown). A drill bit (806) suspended by a drill string (808) from the derrick (802) may drill a wellbore (104) through the subsurface. In accordance with one or more embodiments, the wellbore may be vertical, highly deviated, or horizontal. The wellbore (104) may traverse a plurality of overburden layers (812) and one or more cap-rock layers (814). The wellbore (104) may penetrate one or more hydrocarbon reservoirs (816). Furthermore, the wellbore path may be planned and drilled, based at least in part, on a targeted hydrocarbon reservoir based, at least in part, on the rock types (810).

Figure 9:
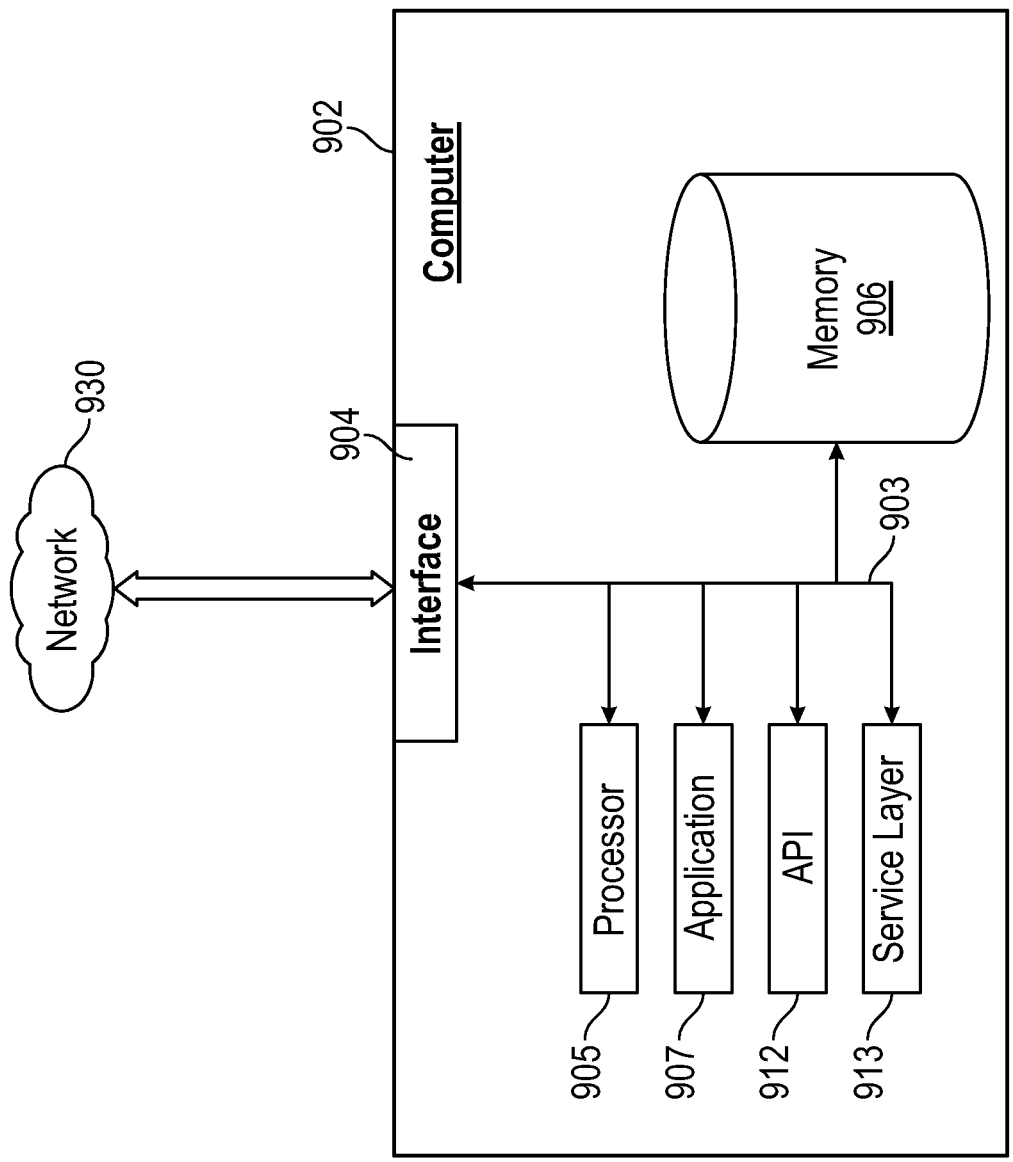
FIG. 9 depicts a computer system in accordance with one or more embodiments.

FIG. 9 depicts a computer system in accordance with one or more embodiments. FIG. 9 depicts a block diagram of the computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a Graphical User Interface (GUI).

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components, such as computer executable instructions, (or a combination of both) that can be connected to the network (930). The memory (906) may be non-transitory computer readable memory. For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a presence of stratigraphic traps, comprising:
   obtaining a Gamma ray (GR) log dataset, wherein the GR log dataset comprises values for a plurality of wells in an area of interest;
   determining a geological time period corresponding to a depth in the GR log dataset;
   determining, using a computer processor, a spectrum of Earth's orbital parameters corresponding to the geological time period, wherein the spectrum of Earth's orbital parameters comprises parameters for eccentricity, obliquity, and precession;
   determining, using the computer processor, peak frequencies of the spectrum of Earth's orbital parameters;
   determining a quantity of orbital cycles per well in the area of interest, wherein the orbital cycles are reflected as sedimentary patterns in a geologic record;
   determining, using the computer processor, a presence of stratigraphic traps, based, at least in part, on differences in quantities of Earth's orbital cycles between one or more wells in the area of interest;
   planning a wellbore trajectory to penetrate an accumulation of hydrocarbons, based, at least in part, on the presence of one or more stratigraphic traps; and
   drilling a wellbore according to the wellbore trajectory;
   wherein determining the quantity of orbital cycles for each well in the area of interest comprises dividing the geological time period by a quantity of years per orbital cycle;
   wherein determining a presence of stratigraphic traps further comprises:
      performing, using the computer processor, well correlation using the GR log dataset for the plurality of wells in the area of interest; and
      determining a presence of subsurface features indicative of a stratigraphic trap.

2. The method of claim 1, wherein determining peak frequencies for the spectrum of Earth's orbital parameters comprises performing spectral analysis of the GR log dataset.

3. The method of claim 1, wherein sedimentary patterns in the geologic record comprise rhythmic, repetitive patterns of sedimentation.

4. A non-transitory computer readable medium storing instructions executable by a computer processor, the instructions comprising functionality for:
   receiving a Gamma ray (GR) log dataset, wherein the GR log dataset comprises values for a plurality of wells in an area of interest;
   determining a geological time period corresponding to a depth in the GR log dataset;
   determining, using a computer processor, a spectrum of Earth's orbital parameters corresponding to the geological time period, wherein the spectrum of Earth's orbital parameters comprises parameters for eccentricity, obliquity, and precession;
   determining, using the computer processor, peak frequencies of the spectrum of Earth's orbital parameters;
   determining a quantity of orbital cycles per well in the area of interest, wherein the orbital cycles are reflected as sedimentary patterns in a geologic record;
   determining, using the computer processor, a presence of stratigraphic traps, based, at least in part, on differences in quantities of Earth's orbital cycles between one or more wells in the area of interest;
   planning a wellbore trajectory to penetrate an accumulation of hydrocarbons, based, at least in part, on the presence of one or more stratigraphic traps; and
   drilling a wellbore according to the wellbore trajectory;
   wherein determining the quantity of orbital cycles for each well in the area of interest comprises dividing the geological time period by a quantity of years per orbital cycle;
   wherein determining a presence of stratigraphic traps further comprises:
      performing, using the computer processor, well correlation using the GR log dataset for the plurality of wells in the area of interest; and
      determining a presence of subsurface features indicative of a stratigraphic trap.

5. The non-transitory computer readable medium of claim 4, wherein determining peak frequencies for the spectrum of Earth's orbital parameters comprises performing spectral analysis of the GR log dataset.

6. The non-transitory computer readable medium of claim 4, wherein sedimentary patterns in the geologic record comprise rhythmic, repetitive patterns of sedimentation.

7. A system comprising:
   a logging system coupled to a plurality of logging tools;
   a drilling system coupled to the logging system; and
   a computer processor, configured to:
      obtain a Gamma ray (GR) log dataset, wherein the GR log dataset comprises values for a plurality of wells in an area of interest;
      determine a geological time period corresponding to a depth in the GR log dataset;
      determine, using a computer processor, a spectrum of Earth's orbital parameters corresponding to the geological time period, wherein the spectrum of Earth's orbital parameters comprises parameters for eccentricity, obliquity, and precession;
      determine, using the computer processor, peak frequencies of the spectrum of Earth's orbital parameters;
      determine a quantity of orbital cycles per well in the area of interest, wherein the orbital cycles are reflected as sedimentary patterns in a geologic record;
      determine, using the computer processor, a presence of stratigraphic traps, based, at least in part, on differences in quantities of Earth's orbital cycles between one or more wells in the area of interest;
      plan a wellbore trajectory to penetrate an accumulation of hydrocarbons, based, at least in part, on the presence of one or more stratigraphic traps; and
      drill a wellbore according to the wellbore trajectory;
      wherein determining the quantity of orbital cycles for each well in the area of interest comprises dividing the geological time period by a quantity of years per orbital cycle;

wherein determining a presence of stratigraphic traps further comprises:
performing, using the computer processor, well correlation using the GR log dataset for the plurality of wells in the area of interest; and
determining a presence of subsurface features indicative of a stratigraphic trap.

8. The system of claim 7, wherein determining peak frequencies for the spectrum of Earth's orbital parameters comprises performing spectral analysis of the GR log dataset.

* * * * *